(12) United States Patent
Dinhobl

(10) Patent No.: US 6,873,495 B2
(45) Date of Patent: Mar. 29, 2005

(54) RECORDING AND/OR REPRODUCING DEVICE COMPRISING A COATED TAPE GUIDE

(75) Inventor: Catherine Dinhobl, Vienna (AT)

(73) Assignees: Hewlett-Packard Ltd., Houston, TX (US); Jabil Circuit Cayman, LP, St. Petersburg, FL (US)

( * ) Notice: Subject to any disclaimer, the term of this patent is extended or adjusted under 35 U.S.C. 154(b) by 0 days.

(21) Appl. No.: 10/272,134

(22) Filed: Oct. 16, 2002

(65) Prior Publication Data

US 2003/0075582 A1 Apr. 24, 2003

Related U.S. Application Data

(63) Continuation of application No. 09/643,317, filed on Aug. 21, 2000, now Pat. No. 6,570,740.

(30) Foreign Application Priority Data

Oct. 18, 2001 (EP) .............................................. 01000542

(51) Int. Cl.$^7$ ................................................. G11B 15/60
(52) U.S. Cl. ................. 360/130.21; 226/193; 242/615.3
(58) Field of Search ......................... 226/193; 242/346, 242/346.2, 615.2, 615.3, 615.4; 360/130.21

(56) References Cited

U.S. PATENT DOCUMENTS

| | | | | |
|---|---|---|---|---|
| 3,787,229 A | * | 1/1974 | Rudness | 242/615.4 |
| 4,456,160 A | * | 6/1984 | Schoettle et al. | 242/615.2 |
| 4,875,127 A | * | 10/1989 | McClure | 360/130.21 |
| 5,370,292 A | * | 12/1994 | Kurokawa et al. | 226/193 |
| 5,447,278 A | * | 9/1995 | Lalouette et al. | 242/615.4 |
| 5,513,057 A | * | 4/1996 | Zieren et al. | 630/122 |
| 6,027,778 A | * | 2/2000 | Alahapperuma et al. | 242/346.2 |
| 6,278,572 B1 | | 8/2001 | Kletzl et al. | |
| 6,318,656 B1 | | 11/2001 | Nemeth | |
| 6,322,014 B1 | | 11/2001 | Nemeth | |
| 6,330,983 B1 | | 12/2001 | Augustin | |
| 6,360,978 B1 | | 3/2002 | Augustin et al. | |
| 6,364,232 B1 | | 4/2002 | Nemeth et al. | |
| 6,366,425 B1 | | 4/2002 | Kletzl et al. | |
| 6,385,005 B1 | | 5/2002 | Kletzl | |
| 6,457,663 B1 | | 10/2002 | Schonhart et al. | |
| 6,550,658 B2 | | 4/2003 | Fraberger | |
| 6,560,062 B1 | | 5/2003 | Kovacs | |
| 6,570,740 B1 | * | 5/2003 | Anderson et al. | 360/130.21 |

FOREIGN PATENT DOCUMENTS

| | | | |
|---|---|---|---|
| JP | 406150255 | * | 5/1994 |
| JP | 2002109799 A | * | 4/2002 |
| WO | WO0161693 | | 8/2001 |

OTHER PUBLICATIONS

Patent Abstracts of Japan, summer Josef: "Tape Guide Having Abrasion-resistant Film" Publication No. 2002109799, Dec. 4, 2002, Application No. 2001248605, Aug. 20, 2001.
Patent Abstracts of Japan, Kuratani Naoto: "Magnetic Head And Fabrication Thereof" Publication No. 05250770, Sep. 28, 1993, application No. 04045687, Mar. 3, 1992.

* cited by examiner

*Primary Examiner*—Eileen D. Lillis
*Assistant Examiner*—Sang Kim

(57) ABSTRACT

A recording and/or reproducing device (1) includes at least one tape guide (10) having a guide wall (13) and guide flanges (14, 15) projecting beyond the guide wall (13). The guide wall and guide flanges are coated with a coating (21) of zirconium nitride or titanium nitride. This results in the tape guide having a high wear resistance and a high resistance to the deposition of material abraded from the tape.

14 Claims, 3 Drawing Sheets

RECORDING AND/OR REPRODUCING DEVICE COMPRISING A COATED TAPE GUIDE

CROSS-REFERENCE TO RELATED APPLICATIONS

This is a continuation-in-part application of U.S. patent application Ser. No. 09/643,317, filed Aug. 21, 2000, now U.S. Pat. No. 6,570,740.

BACKGROUND OF THE INVENTION

1. Field of the Invention

The invention relates to a recording and/or reproducing device for the recording and/or reproduction of information on a tape-shaped data carrier, this data carrier extending in a direction of tape travel and being capable of being moved forward in the direction of tape travel. The recording and/or reproducing device has a magnetic head for scanning the data carrier and at least one tape guide for guiding the data carrier past the magnetic head, wherein the tape guide has a curved guide wall and two guide flanges projecting beyond the guide wall, the guide flanges lying at a distance from one another in a direction extending perpendicularly to the direction of tape travel and adjoining the guide wall, each guide flange merging into the guide wall in a transitional area, wherein the sections of the tape guide that are located in the two transitional areas are able to exert, on the delimiting edges of the data carrier, a force that, in the event of an incorrect movement of the data carrier occurring perpendicularly to the direction of tape travel, counteracts this incorrect movement.

The invention further relates to a tape guide for a recording and/or reproducing device, this tape guide having a guide wall extending in a curve and two guide flanges projecting beyond the guide wall.

2. Description of the Related Art

A recording and/or reproducing device as defined in the first paragraph above having two tape guides of the kind defined in the second paragraph above, is disclosed in International Patent Application No. WO 01/61693 A1, corresponding to U.S. Pat. No. 6,550,658, which means that such a recording and/or reproducing device and such tape guides can be regarded as known.

As has already been explained in the patent cited above, it is possible, as the data carrier, in tape form that is formed by a magnetic tape, moves forward, for incorrect movements to occur in directions extending perpendicularly to the direction of tape travel, in which case the sections of the tape guide that are located in the two transitional areas between the guide wall and the two guide flanges then exert on the delimiting edges of the data carrier, a force that counteracts the incorrect movement described. In the case of the tape guides known from the above-mentioned patent, damping projections are provided in the area of the guide wall of the two tape guide rollers for the purpose of damping such incorrect movements.

Experiments and long-term tests have shown that, as a result of such incorrect movements and the effects that they cause the tape guides and the edges of the record-carrying tape to have on one another, there is both an unacceptably high degree of wear on the tape guides in the sections of the tape guides located in the two transitional areas between the guide wall and the two guide flanges, and also an unacceptably large amount of abrasion in the area of the two edges of the record-carrying tape, this abrasion tending to accumulate in the area of the guide walls of the tape guides, which, in turn, has the consequence that the standard of guidance provided by the tape guides suffers, and that there may be disruptions to proper recording or reproduction by the magnetic head due to the accumulations of abrasion. It should also be mentioned here that no indication is given in the above-mentioned patent of the material of which the known tape guides are composed in the known recording and/or reproducing device. It is known, however, for such tape guides to be manufactured from aluminum, because tape guides of this kind can be manufactured economically but, at the same time, with high precision, and to give a high standard of guidance, and for such tape guides of aluminum to be coated with a layer of nickel. It is also known for such tape guides to be made of brass or steel.

In connection with the problems referred to above, it has already been proposed that the tape guides be provided with a coating, the coating having a surface hardness of at least 10 GPa, corresponding to a value of at least 3200 HV (Vickers hardness). What have been proposed as possible materials in this case are titanium-aluminum nitride, tungsten carbide, silicon nitride, chromium nitride, and DLC (diamond-like carbon). Experiments on tape guides having a coating of one of the foregoing materials have revealed that the hardness of these materials did indeed render it possible to prevent an unacceptably high level of unwanted wear on the tape guides in their sections located in the two transitional areas between the guide wall and the two guide flanges, but it was still not possible to achieve satisfactory recording and/or reproducing conditions and long working lives because, with the tape guides examined that had a coating of one of the aforementioned materials, there was an unacceptably high accumulation of material abraded from the tape in the area of the guide walls of the tape guides.

SUMMARY OF THE INVENTION

The object of the invention is to obviate the difficulties referred to above, and to provide an improved recording and/or reproducing device and an improved tape guide for such a recording and/or reproducing device.

To achieve the above object, features according to the invention are provided in a recording and/or reproducing device according to the invention such that a recording and/or reproducing device according to the invention can be characterized in the following manner, namely:

A recording and/or reproducing device for recording and/or reproducing information on a tape-shaped data carrier, said data carrier extending in a direction of tape travel and being capable of being moved forward in the direction of tape travel, said recording and/or reproduction device being equipped with a magnetic head for scanning the data carrier, and with at least one tape guide, said tape guide being provided and arranged to guide the data carrier past the magnetic head, and having a guide wall extending in a curve and two guide flanges projecting beyond the guide wall, said guide flanges adjoining the guide wall, wherein a transitional area is provided between the guide wall and each of the two guide flanges, and wherein those sections of the tape guide that are located in the two transitional areas are able to exert on the delimiting edges of the data carrier, a force that, in the event of an incorrect movement of the data carrier occurring perpendicularly to the direction of tape travel, counteracts this incorrect movement, and wherein at least the guide wall and the two guide flanges of the tape guide are composed a material that is suitable for the retention of a coating, and wherein at least those sections of the tape guide that are located in the two transitional areas and are able to exert a force on the delimiting edges of the data carrier are provided with a coating, said coating having a surface hardness of at least 2200 HV and a surface tension of not more than 40 mN/m, and not containing any chromium.

To achieve the above object, features according to the invention are provided in a tape guide according to the invention such that a tape guide according to the invention can be characterized in the following manner, namely:

A tape guide for guiding a tape-shaped data carrier, said data carrier extending in a direction of tape travel and being capable of being moved forwards in the direction of tape travel, said tape guide having a guide wall extending in a curve and two guide flanges projecting beyond the guide wall, said guide flanges adjoining the guide wall, wherein a transitional area is provided between the guide wall and each of the two guide flanges, and wherein those sections of the tape guide that are located in the two transitional areas are able to exert, on the delimiting edges of the data carrier, a force that, in the event of an incorrect movement of the data carrier occurring perpendicularly to the direction of tape travel, counteracts this incorrect movement, and wherein at least the guide wall and the two guide flanges of the tape guide are composed of a material that is suitable for the retention of a coating, and wherein at least those sections of the tape guide that are located in the two transitional areas and are able to exert a force on the delimiting edges of the data carrier are provided with a coating, said coating having a surface hardness of at least 2200 HV and a surface tension of not more than 40 mN/m, and not containing any chromium.

What is advantageously achieved by the provision of the features according to the invention is that the sections of a tape guide that are particularly at risk and under stress from the edges of a data carrier in tape form, are well safeguarded against an undesirably high degree of wear, which is attributable to the high value of at least 2200 HV of the surface hardness of the coating and to the chromium-free composition of the coating. What is also advantageously achieved, however, is that material abraded from the tape is prevented from accumulating in the area of the tape guide, such an accumulation being disadvantageous to the satisfactory guidance of a data carrier and to the satisfactory scanning of a data carrier, the prevention being attributable to the low value of not more than 40 mN/m of the surface tension of the coating. The advantage of using coatings according to the invention for coating the delimiting walls of a tape guide, these walls being responsible for guiding a data carrier in tape form, lies, in particular, in the advantageous combination of three properties of these materials that are important in the present connection, namely the combination of high hardness, a chromium-free composition and low surface tension. This advantageous combination of the three aforementioned properties does not arise with the materials referred to previously, namely, titanium-aluminum nitride, tungsten carbide, silicon nitride, chromium nitride, and DLC, this being because titanium-aluminum nitride, chromium nitride and silicon nitride are not sufficiently wear-resistant, and because the surface tension of tungsten carbide and DLC is too high.

In a recording and/or reproducing device according to the invention, and in a tape guide according to the invention, it has been found to be highly advantageous for the coating to be composed of zirconium nitride or titanium nitride. Zirconium nitride has an advantageous surface hardness of 3600 HV, and titanium nitride has an advantageous surface hardness of 2600 HV. The surface tension of zirconium nitride has an advantageous value of approximately 33 mN/m, and the surface tension of titanium nitride has an advantageous value of approximately 40 mN/m. It is an advantage that neither material contains any chromium.

In a recording and/or reproducing device according to the invention, and in a tape guide according to the invention, it is possible for a coating of zirconium nitride or of titanium nitride to be provided only in those sections of the tape guide that are located in the two transitional areas between the guide wall and the two guide flanges. It has, however, proven to be very advantageous if the entire guide wall and the mutually facing delimiting walls of the guide flanges are coated with the coating in their entirety. Such an arrangement has proven to be very advantageous with regard to a simple manufacture.

With regard to the film thickness of the coating provided in accordance with the invention, it may be mentioned that the film thickness is dependent on the design of the tape guide. A tape guide according to the invention may, for example, be formed by a stationary cylindrical tape guide, the cylindrical tape guide wall of which is delimited by guide flanges. Alternatively, however, such a tape guide according to the invention may be formed by a stationary tape guide having a guide wall which is only arcuate or of some other curved shape. With stationary tape guides of this kind, film thicknesses for the coating according to the invention of more than 2.5 μm are advantageous. A tape guide according to the invention may alternatively be formed by a rotatably mounted tape guide roller having a cylindrical guide surface and two guide flanges, in which case it has then been found advantageous for the coating according to the invention to have a thickness of between 1.5 μm and 2.5 μm. It has proven to be particularly advantageous in this case for the coating to have a thickness of 1.8 μm. A coating thickness of this kind is a very good compromise between, on the one hand, a coating that can be produced as quickly, and thus as cheaply, as possible, and, on the other hand, a high resistance to abrasion.

In a recording and/or reproducing device according to the invention, or in a tape guide according to the invention, it has further proven to be very advantageous if the coating has a surface roughness with a roughness value RA of not more than 0.05 μm, and preferably of 0.03 μm. Where steps of this kind are taken, it has been demonstrated in tests that an especially good signal quality can be achieved in the recording or reproduction of signals on or from a data carrier in tape form. Mention may be made of the fact that in certain applications, a coating having a surface roughness with a roughness value RA of only 0.02 μm can be advantageous.

It has proven to be particularly advantageous if the coating is applied by sputtering, and, specifically, by a physical vapor deposition process. Such a process has proven to be particularly advantageous in the present connection, because with this process, relatively low temperatures of not more than approximately 200° C. have been found to be sufficient, which is particularly useful if a tape guide according to the invention is manufactured on the basis of an intermediate product composed of nickel-plated aluminum, the intermediate product then being provided with a coating of zirconium nitride or titanium nitride. Mention may be made of the fact that such an intermediate product may also be made of brass or steel.

These and other aspects of the invention are apparent from and will be elucidated with reference to the embodiments described hereinafter.

BRIEF DESCRIPTION OF THE DRAWINGS

The invention will now be described in more detail with reference to the drawings, which show three embodiments given by way of example but to which the invention is not limited, in which.

DESCRIPTION OF THE PREFERRED EMBODIMENTS

Figure 1:
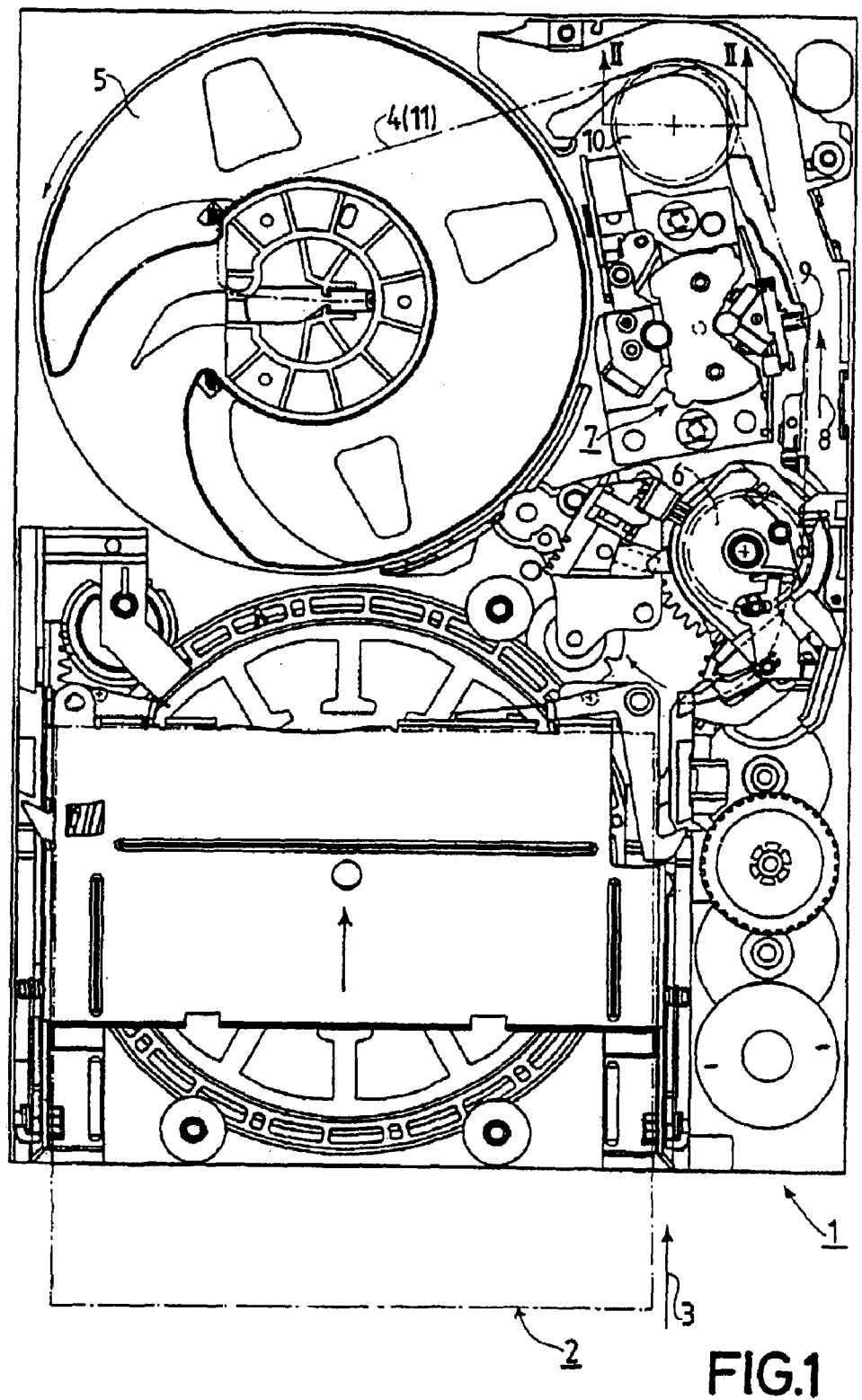
FIG. 1 is a plan view of a recording and/or reproducing device in accordance with a first embodiment of the invention, the device including two tape guides in accordance with a first embodiment of the invention.

FIG. 1 shows a recording and reproducing device 1 intended and arranged for the recording and reproduction of digital data, and with which a large volume of data can be stored. The recording and reproducing device 1 is referred to below as the storage device 1 for short.

In connection with the storage device 1, reference may be made to International Patent Application Nos. WO 00/30090, WO 00/30091, WO 00/30092, WO 00/30093, WO 00/30094, WO 00/30095, WO 00/30096, WO 00/30097, WO 00/30098 and WO 00/35401, corresponding, respectively, to U.S. Pat. Nos. 6,278,572, 6,366,425, 6,364,232, 6,360,978, 6,330,983, 6,322,014, 6,318,656, 6,385,005, 6,560,062 and 6,457,663, and International Patent Application No. WO 01/35402. In the above patents, storage devices are disclosed of which many features are similar or identical to those of the storage device 1 shown in FIG. 1. This reference to the patents listed above incorporates the disclosure thereof herein by reference. For this reason, the further description of the storage device 1 shown in FIG. 1 is confined solely to the areas and parts that are of significance in the present connection.

A cassette 2, indicated only in dot-dash lines in FIG. 1, can be inserted into the storage device 1 in the direction of an arrow 3. Housed in the cassette 2 is a data carrier in tape form, namely a magnetic tape, this magnetic tape being extractable from the cassette 2 by means of an extraction tape 4 provided in the storage device 1, and can then be passed on to a take-up spool 5. After the extraction of the magnetic tape from the cassette 2 has been effected and concluded, the magnetic tape follows the same path as the extraction tape 4, which latter is represented by a dot-dash line in FIG. 1. Following this path, the magnetic tape, not shown in FIG. 1, is then guided away from the cassette 2, across a first tape guide 6, past a magnetic head 9 that is adjustable by an actuator device 7 in a direction perpendicular to the direction of tape travel indicated by arrow 8, and across a second tape guide 10 to the take-up spool 5.

The two tape guides 6 and 10 are tape guide rollers that are rotatably mounted by spindles that are not shown in detail. The construction of the second tape guide 10 is described hereinafter in greater detail with reference to FIGS. 2–4.

Figure 3:
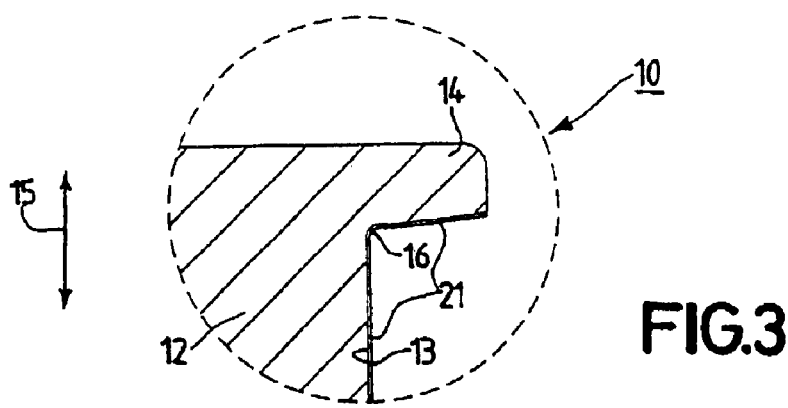
FIG. 3 shows a detail, indicated by circle III—III in FIG. 2, of the tape guide roller of FIG. 2.
Figure 4:
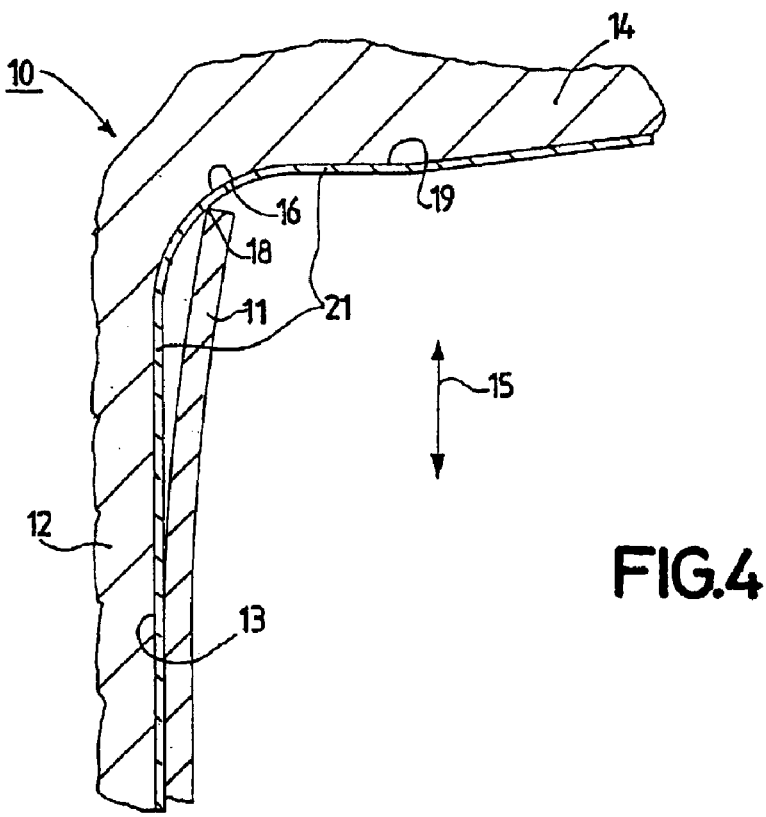
FIG. 4 shows part of the detail of FIG. 3 on a larger scale than FIG. 3, part of a magnetic tape being shown as well.

The tape guide 10 is intended and arranged to guide the magnetic tape, not shown in FIG. 1. A portion of this magnetic tape 11 is shown in FIG. 4. The tape guide 10 is, as mentioned, in the form of a rotatably mounted tape guide roller. The tape guide 10 has, in this case, a tubular part 12 that is delimited by a guide wall 13 extending in a curve, and specifically, by a guide wall 10 extending in a cylindrical shape. Tape guide 10 also has two guide flanges projecting beyond the guide wall 13, namely a first guide flange 14 and a second guide flange 15. The two guide flanges 14 and 15 are located at a distance from one another in a direction, perpendicular to the direction of tape travel 8, that is indicated by a double-headed arrow 15 in each of FIGS. 2–4, the distance between the two guide flanges 14 and 15 being chosen so as to match the width of the magnetic tape to be guided. The two guide flanges 14 and 15 each adjoin the guide wall 13, a respective transitional area 16, 17 being provided between the guide wall 13 and each of the two guide flanges 14 and 15. In the case of the tape guide 10 shown in FIGS. 2 to 4, the two transitional areas 16 and 17 are arcuate in cross-section. In a tape guide 10 that was actually produced for test purposes, a radius of curvature of approximately 0.1 mm was chosen and realized for the transitional areas 16 and 17. What is achieved with the tape guide 10 by virtue of the two transitional areas 16 and 17 being so designed is that the sections of the tape guide 10 that are located in the two transitional areas 16 and 17 are each able to exert, on the delimiting edge 18 of the magnetic tape 11 (see FIG. 4), a force that, if an incorrect movement of the magnetic tape 11 occurs perpendicularly to the direction of tape travel 8, i.e., parallel to the double-headed arrow 15, counteracts this incorrect movement such that the counteracting effect increases as the incorrect movement becomes greater.

Figure 2:
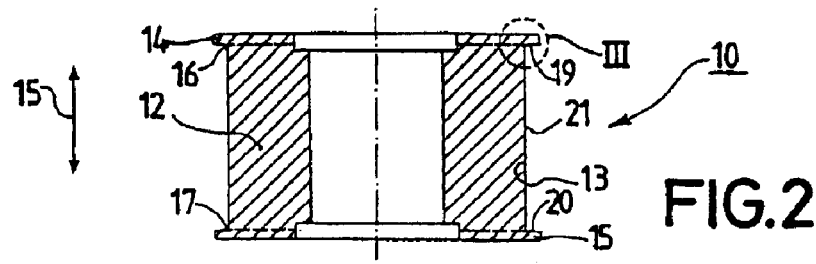
FIG. 2 is a sectional view taken on the line II—II in FIG. 1 of a tape guide roller of the device of FIG. 1.

In the case of the tape guide 10, the design is advantageously so arranged that the hollow cylindrical guide element 12, and, therefore, the guide wall 13, and the two guide flanges 14 and 15 of the tape guide 10, are composed of a material that is suitable for retaining a coating, namely, of nickel-plated aluminum in this case, and the entire guide wall 13 and the mutually facing delimiting walls 19 and 20 of the guide flanges 14 and 15, and, therefore, also the transitional areas 16 and 17 between the guide wall 13 and the guide flanges 14 and 15, are coated in their entirety with a coating 21. Hence, in the case of tape guide 10, those sections of the tape guide 10 that are located in the two transitional areas 16 and 17, these sections being able to exert a force on the relevant edge 18 of the magnetic tape 11, are advantageously coated with the coating 21. The coating 21 of the tape guide 10 shown in FIGS. 2 to 4 is composed of zirconium nitride in this case. The coating 21 may alternatively be formed by a coating of titanium nitride. Other materials having a surface hardness of at least 2200 HV and a surface tension of not more than 40 mN/m may also be used. In addition, the coating should have a surface roughness with a roughness value RA of not more than 0.05 $\mu$m, and preferably of not more than 0.03 $\mu$m.

Figure 5:
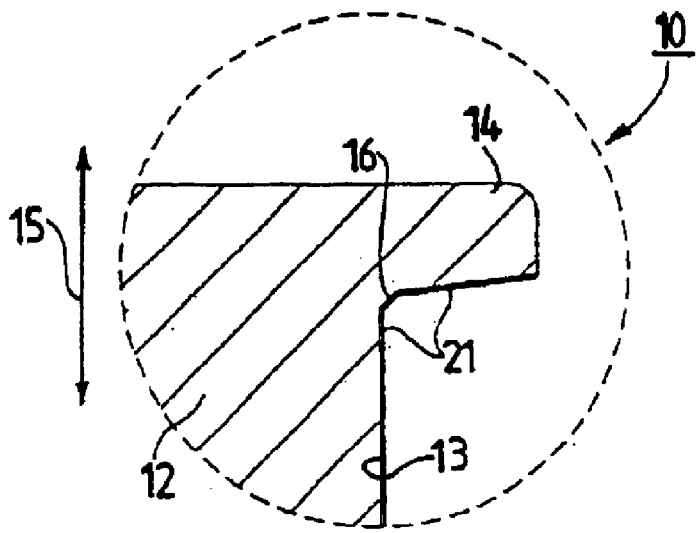
FIG. 5 shows, in a similar way to FIG. 4, a detail of a tape guide in accordance with a second embodiment of the invention.

In the tape guide 10 shown in FIG. 5, the transitional areas between the delimiting wall 13 and the guide flanges are formed by a bevel extending substantially in a straight line. Only the first guide flange 14 and the associated transitional area 16 can be seen in FIG. 5.

Figure 6:
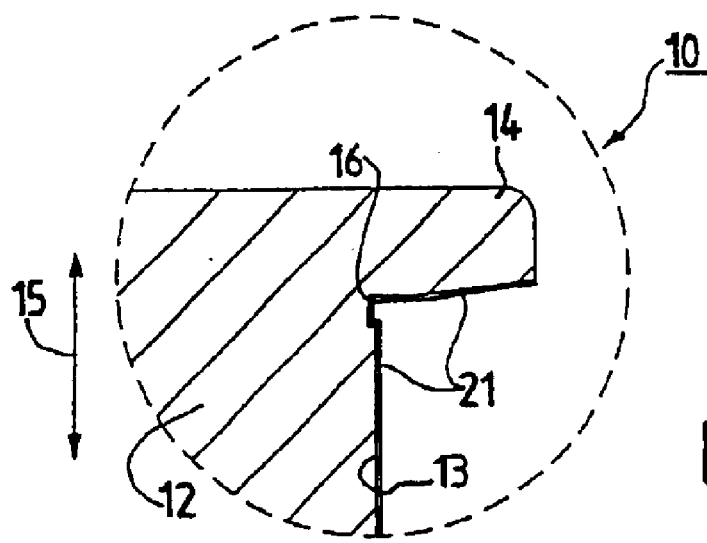
FIG. 6 shows, in a similar way to FIGS. 3 and 5, a detail of a tape guide in accordance with a third embodiment of the invention.

In the tape guide 10 shown in FIG. 6, the transitional areas are formed by an undercut, as can be seen in FIG. 6 in the case of the transitional area 16 at the first guide flange 14.

In the case of the two tape guides 10 shown in FIGS. 5 and 6, coatings 21 are provided in a similar way to those for the tape guide 10 shown in FIGS. 2 to 4, these coatings 21 likewise being composed of zirconium nitride.

IN case of all three of the tape guides 10 shown in FIGS. 2–4, FIG. 5 and FIG. 6, respectively, the provision of the coating 21 provides both a high wear resistance and a high resistance to the deposition of material abraded from the tape, with the result that a long working life and a high standard of tape guidance can be guaranteed for all these tape guides 10.

What is claimed is:

1. A recording and/or reproducing device for recording and/or reproducing information on a tape-shaped data carrier, said data carrier extending in a direction of tape travel and being capable of being moved forward in the direction of tape travel, said recording and/or reproducing device comprising a magnetic head for scanning the data carrier, and at least one tape guide, said tape guide guiding the data carrier past the magnetic head, and comprising a curved guide wall and two guide flanges projecting beyond the guide wall, said two guide flanges having mutually facing delimiting walls adjoining the guide wall, said tape guide having a transitional area between the guide wall and each of the two guide flanges, the sections of the tape guide located in the two transitional areas exerting, on the delimiting edges of the data carrier, a force that counteracts an incorrect movement of the data carrier occurring perpendicularly to the direction of tape travel, wherein at least the guide wall and the two guide flanges of the tape guide are composed of a material suitable for retaining a coating, wherein at least said sections of the tape guide located in the two transitional areas that exert the counteracting force on the delimiting edges of the data carrier are coated with a coating, said coating having a surface hardness of at least 2200 HV, a surface tension of not more than 40 mN/m and not containing chromium, and wherein the coating is composed of zirconium nitride or titanium nitride.

2. The recording and/or reproducing device as claimed in claim 1, wherein the entire guide wall and the mutually facing delimiting walls of the guide flanges are entirely coated with the coating.

3. The recording and/or reproducing device as claimed in claim 2, wherein the coating has a thickness of between 1.5 vm and 2.4.

4. The recording and/or reproducing device as claimed in claim 3, wherein of the coating has a thickness of 1.8 μm.

5. The recording and/or reproducing device as claimed in claim 1, wherein the coating has a surface roughness average (RA) value of not more than 0.05 μm.

6. The recording and/or reproducing device as claimed in claim 5, wherein the coating has a surface roughness average (RA) value of not more than 0.03 μm.

7. The recording and/or reproducing device as claimed in claim 2, wherein the coating has been applied by sputtering, said sputtering comprising a physical vapor deposition (PVD) process.

8. A tape guide for guiding a tape-shaped data carrier, said data carrier extending in a direction of tape travel, and being able to be moved forwards in the direction of tape travel, said tape guide comprising a curved guide wall and two guide flanges projecting beyond the guide wall, said two guide flanges having mutually facing delimiting walls adjoining the guide wall, and a transitional area between the guide wall and each of the two guide flanges, the sections of the tape guide located in the two transitional areas exerting, on the delimiting edges of the data carrier, a force that counteracts an incorrect movement of the data carrier occurring perpendicularly to the direction of tape travel, wherein at least the guide wall and the two guide flanges 15 of the tape guide are composed of a material suitable for retaining a coating, wherein at least the sections of the tape guide located in the two transitional areas and are able to exert a force on the delimiting edges of the data carrier are coated with a coating, said coating having a surface hardness of at least 2200 HV, a surface tension of not more than 40 mN/m, and not containing chromium, and wherein the coating is composed of zirconium nitride or titanium nitride.

9. The tape guide as claimed in claim 8, wherein the entire guide wall and the mutually facing delimiting walls of the two guide flanges are entirely coated with the coating.

10. The tape guide as claimed in claim 9, wherein the coating has a thickness of between 1.5 μm and 2.4 μm.

11. The tape guide as claimed in claim 10, wherein the coating has a thickness of 1.8 μm.

12. The tape guide as claimed in claim 8, wherein the coating has a surface roughness average (RA) value of not more than 0.05 μm.

13. The tape guide as claimed in claim 12, wherein the coating has a surface roughness average (RA) value of not more than 0.03 μm.

14. The tape guide as claimed in claim 9, wherein the coating has been applied by sputtering, said sputtering comprising a physical vapor deposition (PVD) process.

* * * * *